(12) United States Patent
Lashmore et al.

(10) Patent No.: US 8,057,777 B2
(45) Date of Patent: Nov. 15, 2011

(54) SYSTEMS AND METHODS FOR CONTROLLING CHIRALITY OF NANOTUBES

(75) Inventors: David S. Lashmore, Lebanon, NH (US); Craig Lombard, Concord, NH (US)

(73) Assignee: Nanocomp Technologies, Inc., Concord, NH (US)

( * ) Notice: Subject to any disclaimer, the term of this patent is extended or adjusted under 35 U.S.C. 154(b) by 402 days.

(21) Appl. No.: 12/180,300

(22) Filed: Jul. 25, 2008

(65) Prior Publication Data
US 2009/0032741 A1  Feb. 5, 2009

Related U.S. Application Data

(60) Provisional application No. 60/961,887, filed on Jul. 25, 2007.

(51) Int. Cl.
*D01F 9/12* (2006.01)
(52) U.S. Cl. .............. 423/447.3; 423/447.1; 977/843
(58) Field of Classification Search .............. 423/447.1, 423/447.3; 977/843
See application file for complete search history.

(56) References Cited

U.S. PATENT DOCUMENTS

| | | | |
|---|---|---|---|
| 3,090,876 A | 5/1963 | Hutson | |
| 3,109,712 A | 11/1963 | Redfern | |
| 3,706,193 A | 12/1972 | Amato | 57/58.89 |
| 3,943,689 A | 3/1976 | Kunz et al. | 57/34 |
| 4,384,944 A | 5/1983 | Silver et al. | 204/159.13 |
| 4,468,922 A | 9/1984 | McCrady et al. | 57/402 |
| 4,572,813 A | 2/1986 | Arakawa | 264/29.2 |
| 4,987,274 A | 1/1991 | Miller et al. | 174/102 |
| 5,168,004 A | 12/1992 | Daumit et al. | 428/221 |
| 5,428,884 A | 7/1995 | Tsuzuki | 29/290 |
| 5,488,752 A | 2/1996 | Randolph | 15/250.06 |
| 5,905,268 A | 5/1999 | Garcia et al. | 250/504 |
| 6,036,774 A | 3/2000 | Lieber et al. | 117/105 |
| 6,110,590 A | 8/2000 | Zarkoob et al. | 428/364 |
| 6,143,412 A | 11/2000 | Schueller et al. | |
| 6,265,466 B1 | 7/2001 | Glatkowski et al. | 523/137 |
| 6,308,509 B1 | 10/2001 | Scardino et al. | 57/402 |
| 6,333,016 B1 | 12/2001 | Resasco et al. | 423/447.3 |
| 6,452,028 B1 | 9/2002 | Tauchi et al. | |
| 6,452,085 B2 | 9/2002 | Tauchi et al. | |
| 6,495,116 B1 * | 12/2002 | Herman | 423/447.3 |
| 6,541,744 B2 | 4/2003 | Von Arx et al. | |
| 6,682,677 B2 | 1/2004 | Lobovsky et al. | 264/172.11 |
| 6,706,402 B2 | 3/2004 | Rueckes et al. | |
| 6,790,426 B1 | 9/2004 | Ohsaki | |
| 6,842,328 B2 | 1/2005 | Schott et al. | |
| 6,923,946 B2 | 8/2005 | Geohegan et al. | 423/447.1 |
| 7,045,108 B2 | 5/2006 | Jiang et al. | |
| 7,048,999 B2 | 5/2006 | Smalley et al. | 428/367 |
| 7,052,668 B2 * | 5/2006 | Smalley et al. | 423/447.3 |
| 7,182,929 B1 | 2/2007 | Singhal et al. | |
| 7,323,157 B2 | 1/2008 | Kinloch et al. | |
| 7,413,474 B2 | 8/2008 | Liu et al. | |
| 7,437,938 B2 | 10/2008 | Chakraborty | |
| 7,491,883 B2 * | 2/2009 | Lee et al. | |
| 7,553,472 B2 * | 6/2009 | Mouli et al. | 423/447.3 |
| 7,727,504 B2 * | 6/2010 | Kittrell et al. | 423/447.3 |
| 7,750,240 B2 | 7/2010 | Jiang et al. | |
| 2001/0003576 A1 | 6/2001 | Klett et al. | 423/445 |
| 2002/0004028 A1 | 1/2002 | Margrave et al. | 423/447.3 |
| 2002/0040900 A1 | 4/2002 | Arx et al. | |
| 2002/0113335 A1 | 8/2002 | Lobovsky et al. | 264/184 |
| 2002/0130610 A1 | 9/2002 | Gimzewski et al. | |
| 2002/0136681 A1 | 9/2002 | Smalley et al. | 423/447.2 |
| 2002/0159943 A1 | 10/2002 | Smalley et al. | 423/447.1 |
| 2002/0179564 A1 | 12/2002 | Geobegan et al. | |
| 2003/0036877 A1 | 2/2003 | Schietinger | 702/134 |
| 2003/0109619 A1 | 6/2003 | Keller et al. | 524/440 |
| 2003/0133865 A1 | 7/2003 | Smalley et al. | |
| 2003/0134916 A1 | 7/2003 | Hrubesh | |
| 2003/0165648 A1 | 9/2003 | Lobovsky et al. | 428/36.9 |
| 2003/0222015 A1 | 12/2003 | Oyama et al. | 210/500.21 |
| 2004/0020681 A1 | 2/2004 | Hjortstam et al. | |
| 2004/0053780 A1 | 3/2004 | Jiang et al. | 502/182 |
| 2004/0081758 A1 | 4/2004 | Mauthner et al. | |
| 2004/0096389 A1 | 5/2004 | Lobovsky et al. | 423/447.1 |
| 2004/0124772 A1 | 7/2004 | Chen | |
| 2004/0150312 A1 | 8/2004 | McElrath et al. | |
| 2004/0265212 A1 | 12/2004 | Varadan et al. | 423/447.3 |
| 2004/0265489 A1 | 12/2004 | Dubin | |

(Continued)

FOREIGN PATENT DOCUMENTS
EP  1160861 A2  12/2001

(Continued)

OTHER PUBLICATIONS

Biro, et al., "Direct Synthesis of Multi-Walled and Single-Walled Carbon Nanotubes by Spray-Pyrolysis", J. Optoelectronics and Advanced Materials, Sep. 2003; vol. 5, No. 3, pp. 661-666.

Kaili, et al., "Spinning Continuous Carbon Nanotube Yarns", Nature, Oct. 24, 2002, vol. 419, p. 801.

Tapaszto, et al., "Diameter and Morphology Dependence on Experimental Conditions of Carbon Nanotube Arrays Grown by Spray Pyrolysis", Carbon, Jan. 2005; vol. 43, pp. 970-977.

Non-Final Office Action in U.S. Appl. No. 12/140,263 mailed Sep. 20, 2010.

Non-Final Office Action in U.S. Appl. No. 12/187,278 mailed Sep. 29, 2010.

(Continued)

*Primary Examiner* — Stuart Hendrickson
(74) *Attorney, Agent, or Firm* — Greenberg Traurig, LLP; Chinh H. Pham; Seth A. Milman

(57) ABSTRACT

A system is provided that can be utilized to generate nanotubes with substantially similar chirality. The system provides a resonant frequency, keyed to a desired radial breathing mode linked to the desired chirality, that causes a template of catalysts particles or nanotubes to oscillate at the provided resonant frequency, so as to stimulate growing nanotubes to oscillate at a corresponding resonant frequency. This resonant frequency can be a result of a high frequency field or the natural heat radiation generated by the system.

20 Claims, 5 Drawing Sheets

U.S. PATENT DOCUMENTS

| | | | |
|---|---|---|---|
| 2004/0266065 A1 | 12/2004 | Zhang et al. | |
| 2005/0006801 A1 | 1/2005 | Kinloch et al. | 264/5 |
| 2005/0046017 A1 | 3/2005 | Dangelo | 257/720 |
| 2005/0063658 A1 | 3/2005 | Crowley | |
| 2005/0067406 A1 | 3/2005 | Rajarajan et al. | |
| 2005/0074569 A1 | 4/2005 | Lobovsky et al. | 428/36.9 |
| 2005/0087222 A1 | 4/2005 | Muller-Werth | |
| 2005/0104258 A1 | 5/2005 | Lennhoff | 264/465 |
| 2005/0112051 A1 | 5/2005 | Liu et al. | 423/447.1 |
| 2005/0170089 A1 | 8/2005 | Lashmore et al. | 427/248.1 |
| 2005/0269726 A1 | 12/2005 | Matabayas, Jr. | |
| 2006/0118158 A1 | 6/2006 | Zhang et al. | |
| 2006/0252853 A1 | 11/2006 | Ajayan et al. | |
| 2006/0269670 A1 | 11/2006 | Lashmore et al. | 427/249.1 |
| 2006/0272701 A1 | 12/2006 | Ajayan et al. | |
| 2007/0009421 A1 | 1/2007 | Kittrell et al. | 423/447.3 |
| 2007/0048211 A1 | 3/2007 | Jiang et al. | 423/447.3 |
| 2007/0087121 A1 | 4/2007 | Chang et al. | 427/249.1 |
| 2007/0116627 A1 | 5/2007 | Collier et al. | |
| 2007/0140947 A1 | 6/2007 | Schneider et al. | |
| 2007/0151744 A1 | 7/2007 | Chen | 174/110 |
| 2007/0161263 A1 | 7/2007 | Meisner | 439/48 |
| 2007/0232699 A1 | 10/2007 | Russell et al. | |
| 2007/0293086 A1 | 12/2007 | Liu et al. | |
| 2008/0170982 A1 | 7/2008 | Zhang et al. | |
| 2009/0042455 A1 | 2/2009 | Mann et al. | |
| 2009/0044848 A1 | 2/2009 | Lashmore et al. | |
| 2009/0117025 A1 | 5/2009 | Lashmore et al. | |
| 2009/0169819 A1 | 7/2009 | Drzaic et al. | |
| 2009/0194525 A1 | 8/2009 | Lee et al. | |
| 2009/0269511 A1 | 10/2009 | Zhamu et al. | |
| 2009/0277897 A1 | 11/2009 | Lashmore et al. | |
| 2010/0324656 A1 | 12/2010 | Lashmore et al. | |
| 2011/0005808 A1 | 1/2011 | White et al. | |

FOREIGN PATENT DOCUMENTS

| | | |
|---|---|---|
| JP | 2004-315297 | 11/2004 |
| JP | 2005/281672 | 10/2005 |
| JP | 2002-515847 | 5/2008 |
| WO | WO 98/39250 | 9/1998 |
| WO | WO 2006/073460 | 7/2006 |
| WO | WO 2008/036068 | 3/2008 |
| WO | WO 2008/048286 | 4/2008 |
| WO | WO 2011/005964 | 1/2011 |

OTHER PUBLICATIONS

Non-Final Office Action in U.S. Appl. No. 12/038,408 mailed Oct. 14, 2010.

Non-Final Office Action in U.S. Appl. No. 12/437,537 mailed Oct. 25, 2010.

Final Office Action in U.S. Appl. No. 12/191,765 mailed Oct. 28, 2010.

Supplementary European Search Report based on EP 06851553.5 dated Nov. 15, 2010.

R.T.K. Baker et al., "Nucleation and Growth of Carbon Deposits from the Nickel Catalyzed Decomposition of Acetylene", Journal of Catalysis, 26:51-62 (1972).

H.W. Kroto et al., "C60: Buckminsterfullerene", Letters To Nature, 318:162-163, (1985).

Sumio Iijima, "Helical microtubules of graphitic carbon", Letters to Nature, 354:56-58, (1991).

D.S. Bethune et al., Cobalt-catalyzed growth of carbon nanotubes with single-atomic-layer walls, Letters to Nature, 363:605-607 (1993).

M. Jose-Yacaman et al., "Catalytic growth of carbon microtubules wth fullerene structure", Applied Physics Letters, 62(6):657-659 (1993).

Gun-Do Lee et al, "Catalytic decomposition of acetylene on Fe (001): A firstprinciples study", The American Physical Society, Physical Review B66 081403R:14 (2002).

N. Seo Kim et al., "Dependence of the Vertically Aligned Growth of Carbon Nanotubes on the Catalyst", The Journal of Physical Chemistry, 106(36):92869290 (2002).

H. W. Zhu et al., "Direct Synthesis of Long Single-Walled Carbon Nanotube Strands", Science, 296:884-886 (2002).

Ki-Hong Lee et al., "Control of growth orientation for carbon nanotubes", Applied Physics Letters, 82(3): 448-450, (2003).

E. F. Kukovitsky et al., "CVD growth of carbon nanotube films on nickel substratd", Applied Surface Science, 215:201-208 (2003).

Gou, J.G., "Single-Walled Carbon Nanotube Bucky Paper/Epoxy Composites: Molecular Dynamics Simulation and Process Development", PhD dissertation, The Florida State University, 2002, p. 9126.

Li, et al. "Direct Spinning of Carbon Nanotube Fibers from Chemical Vapor Deposition Synthesis", Science Magazine, 2004, vol. 304, pp. 276-278.

PCT International Search Report based on PCT/US08/71220, dated Apr. 3, 2009.

Okabe, T. et al., New Porous Carbon Materials, Woodceramics: Development and Fundamental Properties, Journal of Porous Materials, vol. 2, pp. 207-213, 1996.

Seung-Yup Lee et al., Synthesis of Carbon Nanotubes Over Gold Nanoparticle Supported Catalysts, Carbon, 43 (2005), pp. 2654-2663.

Office Action cited in U.S. Appl. No. 11/415,927 mailed Feb. 22, 2010.

Office Action cited in U.S. Appl. No. 11/415,927 mailed Sep. 9, 2010.

Office Action cited in U.S. Appl. No. 11/715,756 mailed Jan. 25, 2010.

Office Action cited in U.S. Appl. No. 11/818,279 mailed Jun. 2, 2010.

Office Action cited in U.S. Appl. No. 12/187,278 mailed Jun. 11, 2010.

Office Action cited in U.S. Appl. No. 12/191,765 mailed May 14, 2010.

Office Action cited in U.S. Appl. No. 12/390,906 mailed Jul. 9, 2010.

International Search Report based on PCT/US2009/043209 dated Mar. 3, 2010.

International Search Report based on PCT/US2010/041374 dated Sep. 8, 2010.

European Search Report based on EP 06849762.7 dated Jan. 14, 2010.

Australian Examiner's Report cited in AU Serial No. 2006249601 dated Jun. 24, 2010.

Australian Examiner's Report cited in AU Serial No. 2006350110 dated Feb. 9, 2010.

Huck et al., "Dynamic Control and Amplification of Molecular Chirality by Circular Polarized Light," Science, 273(5282), pp. 1686-1688 (Sep. 20, 1996).

Huck et al., "Molecular Chirality Control and Amplification by CPL: Correction," Science, 276(5311), pp. 337-341 (Apr. 18, 1997).

Moisala et al., "Single-walled carbon nanotube synthesis using ferrocene and iron pentacarbonyl in a laminar flow reactor," Chemical Engineering Science, 61(13), pp. 4393-4402 (Jul. 2006).

Final Office Action in U.S. Appl. No. 11/488,387 mailed Jan. 21, 2011.

Final Office Action in U.S. Appl. No. 12/390,906 mailed Jan. 24, 2011.

Final Office Action in U.S. Appl. No. 12/187,278 mailed Feb. 25, 2011.

Official Action cited in JP Serial No. 2008-540155 dated Mar. 8, 2011.

Final Office Action in U.S. Appl. No. 12/140,263 mailed Mar. 9, 2011.

Non-Final Office Action in U.S. Appl. No. 11/415,927 mailed Mar. 10, 2011.

Non-Final Office Action in U.S. Appl. No. 12/191,765 mailed Apr. 4, 2011.

Non-Final Office Action in U.S. Appl. No. 12/566,229 mailed Apr. 6, 2011.

Non-Final Office Action in U.S. Appl. No. 12/437,537 mailed Apr. 7, 2011.

Final Office Action in U.S. Appl. No. 12/038,408 mailed Apr. 13, 2011.

Gou, J.G., "Passage: Nanotube Bucky Papers and Nanocomposites", Ph.D. Dissertation, Marburg An Der Lahn, pp. 93-126, Jan. 1, 2002.

Hanson, G.W., "Fundamental Transmitting Properties of Carbon Nanotube Antennas", IEEE Transactions on Antennas and Propagation, vol. 53, No. 11, pp. 3426-3435, Nov. 2005.

Merriam Webster Dictionary definition of "along", available at http://merriam-webster.com/dictionary/along (retrieved Sep. 16, 2010).

"Metallurgical & Chemical Engineering", McGraw Publishing Co., vol. 15, No. 5, pp. 258-259, Dec. 15, 1916.

Schaevitz et al., "*A Combustion-Based Mems Thermoelectric Power Generator*", The 11th Conference on Solid-State Sensors and Actuators, Munich, Germany, Jun. 10-14, 2001.

Xiao et al., "*High-Mobility Thin-Film Transistors Based on Aligned Carbon Nanotubes*", Applied Physics Letters, vol. 83, No. 1, pp. 150-152, Jul. 7, 2003.

Office Action cited in U.S. Appl. No. 11/413,512 mailed Jul. 8, 2010.

Feringa et all., *Molecular Chirality Control and Amplification by CPL: Correction*, Science 276 (5311) 337-341.

Katauraa et al., *Diameter Control of Single-walled Carbon Nanotubes*, Carbon 38 (2000) 1691-1697.

Moore V. et al., *Individually Suspended Single-Walled Carbon Nanotubes in Various Surfactants*, Nano Letters, vol. 3, pp. 1379-1382, 2002.

Nasibulin et al., *Correlation between catalyst particle and single-walled carbon nanotube diameters*, Carbon 43 (2005), 2251-2257.

Patel N. et al., *Dispersing Nanotubes with Surfactants: A Microscopic Statistical Mechanical Analysis*, Journal of American Chemical Society, vol. 127, pp. 1412414125, 2005.

Sinani V. et al., *Aqueous Dispersions of Single-wall and Multiwall Carbon Nanotubes with Designed Amphiphilic Polycations*, Journal of American Chemical Society, vol. 127, pp. 3463-3482, 2005.

Yurekli K. et al., *Small-Angle Neutron Scattering from Surfactant-Assisted Aqueous Dispersions of Carbon Nanotubes*, Journal of American Chemical Society, vol. 126, pp. 9902-9903, 2004.

\* cited by examiner

Relationship between resonant frequency and tube diameter

SYSTEMS AND METHODS FOR CONTROLLING CHIRALITY OF NANOTUBES

RELATED U.S. APPLICATION(S)

The present invention claims priority to U.S. Provisional Application Ser. No. 60/961,887, filed Jul. 25, 2007, which application is hereby incorporated herein by reference.

GOVERNMENT SUPPORT

The invention was supported, in whole or in part, by Contract No. FA 8650-08-M-2823 from the Air Force. The Government may have certain rights in the invention.

TECHNICAL FIELD

The present invention relates to systems and methods for manufacturing nanotubes, and more particularly, to systems and methods for controlling the chirality of nanotubes during manufacturing.

BACKGROUND ART

Carbon nanotubes have anisotropic structures with a variety of shapes, including single-walled, multi-walled, and bundled into rope-like multi-tube structures, among others. Carbon nanotubes typically range in diameter from about fractions of a nanometers to several tens of nanometers, and range in length from about several microns to several millimeters. Carbon nanotubes also exhibit conductive or semiconductive properties depending on their chirality. For example, it is generally recognized that carbon nanotubes having an arm-chair structure exhibit metallic properties, whereas carbon nanotubes having a zig-zag structure exhibit semiconductive or metallic properties depending on diameter.

In addition, it has been observed that the electronic and, perhaps, the mechanical characteristics of carbon nanotubes, such as single wall carbon nanotubes, may be governed by their chirality, and that their chirality may in turn be governed by the diameter of the catalysts from which the nanotubes are grown (Nasibulin et. al., Carbon 43 (2005), 2251-2257). Chirality often refers to the roll-up vector for the nanotube. Chirality has been described extensively in the literature (Satto et al., *Physical Properties of Carbon Nanotubes*, Imperial College Press (2004) pg 37), and may be specified by a vector $C_h$ represented as:

$$C_h = m a_1 + n a_2$$

where $a_1$ and $a_2$ are real vectors of a hexagonal sublattice of graphite constituting the surface of the carbon nanotube.

In such a vector, when n-m is divisible by 3, the carbon nanotube is believed to exhibit metallic properties. Otherwise, the carbon nanotube is believed to exhibit semiconductive properties. For those carbon nanotubes exhibiting semiconductive properties, their band gap may also be affected by and change with the chiral vector. For certain applications, such as photonic detectors, or for transistor synthesis, control of the chiral vector (i.e., chirality) can be critical. Given that the diameter of carbon nanotubes can be expressed as $$d_t = a[n^2 + m^2 + nm]^{1/2},$$

it should be appreciated that with a very small change in the nanotube diameter, i.e., $d_t$, there can be a significant effect on electronic character of the nanotube.

As an example, if "m" and "n" determine the metallic or semiconductor characteristic of the carbon nanotube, then changes in the electronic character of the carbon nanotube can occur with changes in its diameter "d". The sensitivity, at the level of an individual carbon nanotube, can be in fractions of a nanometer. As a result, chirality control through control of the diameter, at present, can be difficult, if not impossible. For instance, if n=6 and m=5, then by definition d=0.948 a in nanometers (nm). However, if "n" were maintained such that n=6 and "m" were changed so that m=3, then d=0.793 a nm. The latter nanotube, with a slight change in "m", becomes a metallic conductor, whereas the former is a semiconductor.

It is well accepted that applications using carbon nanotubes can be wide-ranging, including those in connection with memory devices, electron amplifiers, gas sensors, microwave shields, electrodes, electrochemical storage, field emission displays, and polymer composites among others. Specifically, semiconducting carbon nanotubes can be used, for instance, in memory devices, sensors, etc., while metallic carbon nanotubes may be used in electrode materials of cells, electromagnetic shields, etc. To make these applications practical using carbon nanotubes, it will, therefore, be necessary to obtain and/or created carbon nanotubes with a specific diameter or diameter range, in order to obtain carbon nanotubes with a specific chirality.

Selection between the metallic and semiconductive characteristics, therefore, requires a substantially precise ability control of the catalyst diameter. In some instances, the accuracy needs to be better than about 0.155 nm. However, it should be noted that this difference can become even closer, as "m" and "n" become large. Adding to the difficulty is the ability to precisely control the catalyst diameter during the growth process. In particular, if the catalysts are in a molten state (*Applied Physics Letters* 87, 051919 _2005_), the presence of droplet vibrations can likely introduce considerable diameter variations in the resulting carbon nanotube generated. If, on the other hand, the catalysts are in a crystalline state, these catalysts are likely formed from metallic clusters that also vary in diameter. As a result, carbon nanotubes generated from such metallic clusters can also vary in diameter.

There exist several historic approaches that have been taken to select, for example, single wall carbon nanotubes of a given chirality. These include: (1) attempts to control diameter of the catalyst particle (Katauraa et al., *Diameter Control of Single-walled Carbon Nanotubes*, Carbon 38 (2000) 1691-1697), (2) epitaxial growth of nanotubes on fragments of known chirality (U.S. Pat. No. 7,052,668), (3) using electric discharging or laser deposition to produce nanotubes having specific chirality, and (4) selection of only those tubes meeting the desired chirality after a batch of tubes have bee made and processed (Feringa et al. *Molecular Chirality Control and Amplification by CPL: Correction*, Science 276 (5311) 337-342). Of these, the last one seems to offer the most promise. However, it has been observed that such an approach can be destructive, may not let an operator preselect chirality with great accuracy (http://www.fy.chalmers.se/conferences/nt05/abstracts/P357), and can also be time consuming.

Accordingly, it would be desirable to provide an approach that can permit a predetermined chirality to be specified or defined substantially precisely, so that nanotubes with such specified chirality can subsequently be fabricated, and which approach can permit a volume of substantially uniform nanotubes with substantially uniform chirality to be obtained.

SUMMARY OF THE INVENTION

The present invention can be adapted to provide, among other things, (1) an approach that permits the chirality of the nanotubes to be specified or defined substantially precisely prior to fabrication, so that the fabricated nanotubes can be provided with the specified chirality, and (2) an approach that can precisely select nanotubes having a specific or defined chirality during fabrication.

In accordance with one embodiment of the present invention, a system for manufacturing nanotubes is provided. The system includes, in one embodiment a synthesis chamber within which nanotubes growth can be initiated. In an embodiment, the chamber includes an inlet through which reactive gas necessary for nanotube growth can be introduced. The synthesis chamber may also include an inlet through which a catalyst precursor may be introduced. The system also includes a cavity positioned within the synthesis chamber designed to resonate at a selected resonant frequency keyed to a radial breathing mode unique to a desired chiral nature of a nanotube to be manufactured. The system further includes a source for generating the selected resonant frequency in the cavity, such that the selected resonant frequency can be imposed on a plurality of catalyst particles situated within the synthesis chamber and from which nanotubes growth can occur, so as to permit nanotubes of exhibiting a resonant frequency substantially similar to the selected resonant frequency, and thus similar to the unique desired chiral nature, to be grown. In an embodiment, the source can provide one of an electromagnetic field, and electric field or a magnetic field for generating the resonant frequency.

In another embodiment, an alternate system for manufacturing nanotubes is provided. The system includes a synthesis chamber within which nanotubes growth can be initiated. In an embodiment, the synthesis chamber may be provided with an inlet through which reactive gas necessary for nanotube growth can be introduced. The synthesis chamber may also be provided with an inlet through which a catalyst precursor may be introduced. The system also includes a radiating plate positioned within the synthesis chamber and having thereon at least one preselected nanotube having a desired chiral nature. The preselected nanotube on the radiating plate, in and embodiment, is capable of re-radiating at its natural frequency which approximate the diameter of the preselected nanotube. The system further includes a heat source in communication with the synthesis chamber and designed to generate sufficient heat energy, so as to cause the preselected nanotube on the radiating plate to re-radiate at its natural frequency. In the presence of the re-radiating preselected nanotube, other nanotubes growing within the synthesis chamber adjacent to the preselected nanotube can be stimulated to resonate at a similar frequency and grow with a substantially similar chirality as that exhibited by the preselected nanotube.

The present invention also provides a method for manufacturing nanotubes. The method includes initially exposing a plurality of catalyst particles from which nanotubes can grow to a substantially high frequency field. Such a high frequency field can be an electromagnetic field, an electric field, or a magnetic field. The catalyst particles may in addition be exposed to a substantially high temperature and a reactive gas necessary to permit nanotube growth. Next, the catalyst particles may be resonated at a selected resonant frequency that can be keyed to a radial breathing mode to a diameter unique to a desired chiral nature of a nanotube to be manufactured. The catalyst particles, in an embodiment, may be in a laminar flow, a fluidized bed, or seeded on a substrate. Thereafter, those nanotubes having a resonant frequency substantially similar to the selected resonant frequency, and thus the unique desired chiral nature, are allowed to be grown. The grown nanotubes, in one embodiment, may be substantially uniform in their chiral nature.

The present invention further provides another method for manufacturing nanotubes. The method includes initially exposing a preselected nanotube having a desired chiral nature in an environment having a heat source with sufficient heat energy to radiate the preselected nanotube. The preselected nanotube, in an embodiment, may be secured to a substrate, and the heat source may emit a substantially high temperature exceeding about 1250° C. In addition, a catalyst precursor may be introduced into the environment in the presence of the preselected nanotube to permit subsequent nanotube growth. Next, the radiated nanotube may be allowed to re-radiate at its natural frequency in the presence of the heat source. The natural frequency, in one embodiment, approximates the diameter of the re-radiating nanotube. Thereafter, the re-radiating nanotube may be permitted to stimulate nanotubes growing adjacent thereto to grow with a substantially similar chirality as that exhibited by the re-radiating nanotube. The grown nanotubes, in an embodiment, may be substantially uniform in their chiral nature.

A system for manufacturing nanotubes can also be provided by the present invention. The system includes a first furnace for generating radiant energy, for instance, exceeding about 1250° C., and within a terahertz frequency or small band of frequencies. The system also includes a filter positioned within the first furnace to select for energy within a particular resonant frequency or small band of frequencies corresponding to a chiral nature of a desired nanotube. The filter, in an embodiment, includes a frequency selected surface having one or more slots dimensioned to permit energy within a selected resonant frequency or small band of frequencies to pass therethrough. The system further includes a second furnace in fluid communication with the first furnace for receiving the selected energy within a particular resonant frequency or small band of frequencies. The second furnace may be provided with an inlet for introducing reactive gas and an inlet for introducing a catalyst precursor into the second furnace for use in the growth of nanotubes. A template may be situated in the second furnace for providing a footprint from which nanotubes can grow. In an embodiment, the template may be capable of being stimulated in the presence of the selected energy, so as to permit nanotubes exhibiting a resonant frequency substantially similar to the selected resonant frequency or small band of frequencies, and thus the desired chiral nature, to grow.

A method of manufacturing nanotube, based on the above system, is further provided, in accordance with an embodiment of the present invention. The method includes initially generating within a first environment radiant energy, for instance, exceeding about 1250° C., and within a terahertz frequency or small band of frequencies. Next, the radiant energy may be filtered within the first environment, so as to select for energy within a particular resonant frequency or small band of frequencies corresponding to a chiral nature of a desired nanotube. Thereafter, the selected energy within a particular resonant frequency or small band of frequencies may be directed from the first environment into a second environment. A reactive gas may also be introduced into the second environment for use in growing nanotubes. A template positioned in the second environment to the selected energy, may subsequently be exposed to the selected energy, and reactive gas, so that the template can be stimulated in the presence of the selected energy to a footprint from which nanotubes can grow. Once growth is initiated, nanotubes exhibiting a resonant frequency substantially similar to the selected resonant frequency or small band of frequencies, and thus the desired chiral nature, are permitted to grow from the template.

In another embodiment of the invention, a radiating energy generator is provided. The generator includes a housing having a first end, an opposite second end, and reflective interior surfaces extending between the first end and the second end. The housing, in embodiment, may be sufficient small or portable in size. The generator also includes a heat source positioned at the first end of the housing for generating radiant energy. The heat source may be designed to generate pulses of energy, such as a flash lamp, and may include a capacitor to provide sufficient power to permit heat generation. The generator further includes a filter positioned at the second end of the housing to allow only energy within a terahertz range to pass. The filter, in an embodiment, may include a frequency selective surface that includes one or more slots dimensioned to permit energy within a terahertz range to pass through. An exit port may be provided at the second end of the housing and adjacent the filter through which only the energy within the terahertz range can leave the housing.

In a further embodiment of the invention, a method for generating power is provided. The method includes initially providing a reflective pathway. Next, radiant energy may be directed from one end of the reflective pathway towards an opposite end of the reflective pathway. Thereafter, the radiant energy may be filtered at the opposite end of the reflective pathway to allow only energy within a terahertz range to be selected. Subsequently, only the energy within the terahertz range may be allowed to exit the reflective pathway.

Various uses and applications by the radiant energy generator of the present invention are also provided.

DESCRIPTION OF SPECIFIC EMBODIMENTS OF THE INVENTION

Figure 1A:
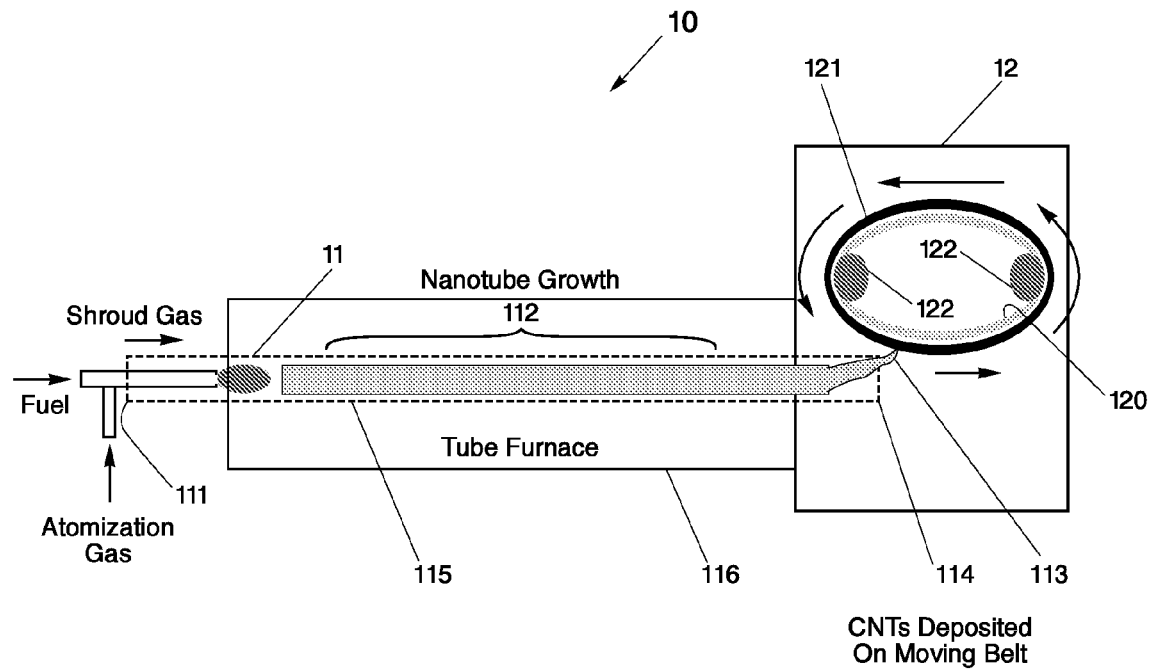
FIGS. 1A-B illustrates a Chemical Vapor Deposition system for fabricating nanotubes, in accordance with one embodiment of the present invention.
Figure 1B:
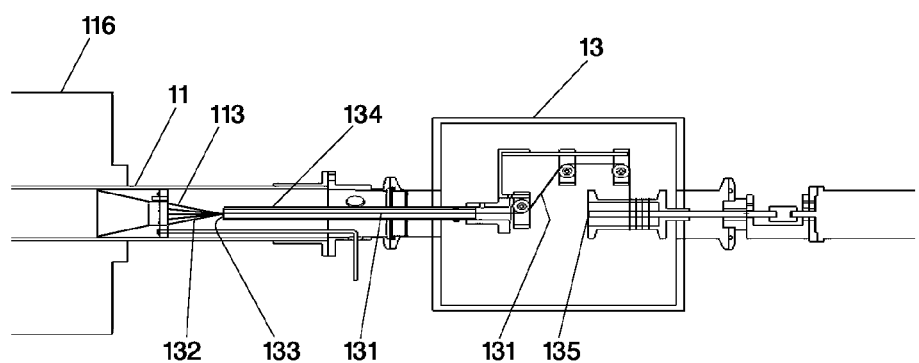

Presently, there exist multiple processes and variations thereof for growing nanotubes. These include: (1) Chemical Vapor Deposition (CVD), a common process that can occur at near ambient or at high pressures, and at temperatures above about 400° C., (2) Arc Discharge, a high temperature process that can give rise to tubes having a high degree of perfection, and (3) Laser ablation.

The present invention, in one embodiment, employs a CVD process or similar gas phase pyrolysis procedures known in the industry to generate the appropriate nanostructures, including carbon nanotubes. It should be noted that although reference is made throughout to nanotube synthesized from carbon, other compound(s) may be used in the synthesis of nanotubes in connection with the present invention. For instance, it should be understood that boron nanotubes may also be grown, but with different chemical precursors. Other methods, such as plasma CVD or the like can also be used.

Growth temperatures for a CVD process can be comparatively low ranging, for instance, from about 400° C. to about 1300° C. Carbon nanotubes, both single wall (SWNT) or multiwall (MWNT), may be grown, in an embodiment of the present invention, by exposing nanostructural catalyst particles in the presence of reagent carbon-containing gases (i.e., gaseous carbon source). In particular, the nanostructural catalyst particles may be introduced into the reagent carbon-containing gases, either by addition of existing particles or by in situ synthesis of the particles from a metal-organic precursor, or even non-metallic catalysts. Although both SWNT and MWNT may be grown, in certain instances, SWNT may be selected due to their relatively higher growth rate and tendency to form rope-like structures, which may offer advantages in handling, thermal conductivity, electronic properties, and strength.

The strength of the individual carbon nanotubes generated in connection with the present invention may be about 30 GPa or more. Strength, as should be noted, is sensitive to defects. However, the elastic modulus of the carbon nanotubes fabricated in the present invention may not be sensitive to defects and can vary from about 1 to about 1.2 TPa. Moreover, the strain to failure of these nanotubes, which generally can be a structure sensitive parameter, may range from a few percent to a maximum of about 15% in the present invention.

Furthermore, the nanotubes of the present invention can be provided with relatively small diameter, so that relatively high double layer capacitance can be generated when these materials are used in the form of an electrode. In an embodiment of the present invention, the nanotubes fabricated in the present invention can be provided with a diameter in a range of from less than 1 nm to about 10 nm.

The individual carbon nanotubes generated in connection with the present invention, in particular, single-walled carbon nanotubes, can also be substantially uniform in their chirality. In an embodiment of the invention, the radial breathing mode (RBM) of a particular nanotube diameter may be identified and utilized, so that single-walled nanotubes with a specific diameter and, thus, chirality can subsequently be selected during fabrication. In particular, since the RBM can be unique to the chiral nature of the nanotube, the RBM can provide a footprint from which the chirality can be selected prior to fabrication, as well as maintained throughout the growth process, so long as the catalyst particle from which each carbon nanotubes may be grown substantially maintains its diameter throughout the growth process. It is recognized that the growth of a nanotube from a catalyst may have to be initiated in order for the imposed electromagnetic radiation to act on that nanotube and affect its chirality.

Carbon nanotubes having a particular diameter range, including a diameter size of about 0.948 a nm, exhibit semiconductive properties, while those having a relatively smaller diameter range, including a diameter size of about 0.793 a nm, can be metallic conductors. The uniformity of the specific diameter, and thus chirality, allows the carbon nanotubes of the present invention to be use in connection with particular applications. As an example, the semiconducting single-walled carbon nanotubes of the present invention can be used, for instance, in memory devices, sensors, etc., while the metallic single-walled carbon nanotubes of the present invention can be used, for instance, in electrode materials of cells, electromagnetic shielding, microwave antennas, electrical conductors, etc.

Systems for Fabricating Nanotubes

With reference now to FIG. 1A, there is illustrated a system 10, similar to that disclosed in U.S. patent application Ser. No. 11/488,387 (incorporated herein by reference), for use in the fabrication of nanotubes. System 10, in an embodiment, may be coupled to a synthesis chamber 11. The synthesis chamber 11, in general, includes an entrance end 111, into which reaction gases may be supplied, a hot zone 112, where synthesis of extended length nanotubes 113 may occur, and an exit end 114 from which the products of the reaction, namely the nanotubes and exhaust gases, may exit and be collected. The synthesis chamber 11, in an embodiment, may include a quartz tube 115 extending through a furnace 116. The nanotubes generated by system 10, on the other hand, may be individual single-walled nanotubes, bundles of such nanotubes, and/or intertwined single-walled nanotubes (e.g., ropes of nanotubes).

System 10, in one embodiment of the present invention, may also include a housing 12 designed to be substantially airtight, so as to minimize the release of potentially hazardous airborne particulates from within the synthesis chamber 11 into the environment. The housing 12 may also act to prevent oxygen from entering into the system 10 and reaching the synthesis chamber 11. In particular, the presence of oxygen within the synthesis chamber 11 can affect the integrity and compromise the production of the nanotubes 113.

System 10 may also include a moving belt 120, positioned within housing 12, designed for collecting synthesized nanotubes 113 made from a CVD process within synthesis chamber 11 of system 10. In particular, belt 120 may be used to permit nanotubes collected thereon to subsequently form a substantially continuous extensible structure 121, for instance, a non-woven sheet. Such a non-woven sheet may be generated from compacted, substantially non-aligned, and intermingled nanotubes 113, bundles of nanotubes, or intertwined nanotubes (e.g., ropes of nanotubes), with sufficient structural integrity to be handled as a sheet.

To collect the fabricated nanotubes 113, belt 120 may be positioned adjacent the exit end 114 of the synthesis chamber 11 to permit the nanotubes to be deposited on to belt 120. In one embodiment, belt 120 may be positioned substantially parallel to the flow of gas from the exit end 114, as illustrated in FIG. 1A. Alternatively, belt 120 may be positioned substantially perpendicular to the flow of gas from the exit end 114 and may be porous in nature to allow the flow of gas carrying the nanomaterials to pass therethrough. Belt 120 may be designed as a continuous loop, similar to a conventional conveyor belt. To that end, belt 120, in an embodiment, may be looped about opposing rotating elements 122 (e.g., rollers) and may be driven by a mechanical device, such as an electric motor. Alternatively, belt 120 may be a rigid cylinder. In one embodiment, the motor may be controlled through the use of a control system, such as a computer or microprocessor, so that tension and velocity can be optimized.

In an alternate embodiment, instead of a non-woven sheet, the fabricated single-walled nanotubes 113 may be collected from synthesis chamber 11, and a yarn 131 may thereafter be formed. Specifically, as the nanotubes 113 emerge from the synthesis chamber 11, they may be collected into a bundle 132, fed into intake end 133 of a spindle 134, and subsequently spun or twisted into yarn 131 therewithin. It should be noted that a continual twist to the yarn 131 can build up sufficient angular stress to cause rotation near a point where new nanotubes 113 arrive at the spindle 134 to further the yarn formation process. Moreover, a continual tension may be applied to the yarn 131 or its advancement into collection chamber 13 may be permitted at a controlled rate, so as to allow its uptake circumferentially about a spool 135.

Typically, the formation of the yarn 131 results from a bundling of nanotubes 113 that may subsequently be tightly spun into a twisting yarn. Alternatively, a main twist of the yarn 131 may be anchored at some point within system 10 and the collected nanotubes 113 may be wound on to the twisting yarn 131. Both of these growth modes can be implemented in connection with the present invention.

As provided hereinafter in more detail, system 10 of the present invention can be adapted to provide (1) an approach that permits the chirality of the nanotubes to be specified or defined substantially precisely prior to fabrication, so that the fabricated nanotubes can be provided with the specified chirality, and (2) an approach that can precisely select nanotubes having a specific or defined chirality during fabrication.

Passive Control of Chirality

System 10 of the present invention can be designed to include a device for passive control of the chirality of the nanotubes fabricated during growth. In particular, system 10 can use such a device to permit the chirality of the single-walled nanotubes being generated to be specified or defined substantially precisely prior to fabrication. As such, only single-walled nanotubes with the specified chirality can subsequently be fabricated. System 10 can, therefore, can be utilized to produce substantially uniform carbon nanotubes of the same chirality.

Figure 2:
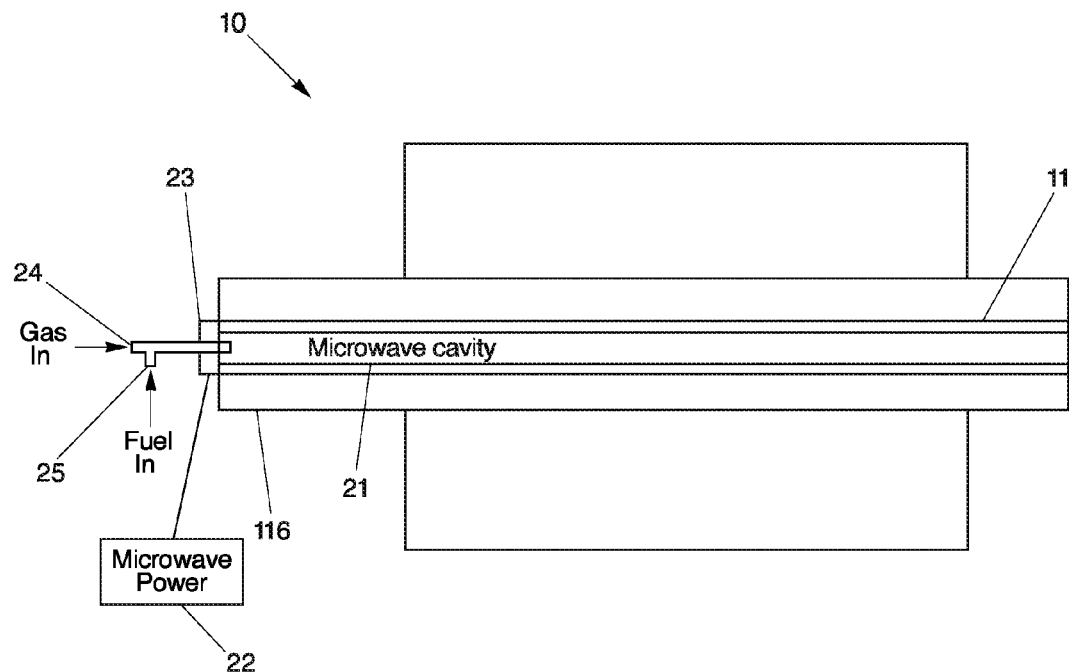
FIG. 2 illustrates a microwave cavity for use in connection with the system shown in FIG. 1 for passively controlling the chirality of the carbon nanotubes being fabricated.

In accordance with an embodiment of the present invention, as illustrated in FIG. 2, a resonant cavity 21 may be established within a CVD synthesis chamber 11 of furnace 116 (i.e., reactor). The resonant cavity 21, in an embodiment, may be designed so that in the presence of a substantially high frequency field, it can be caused to resonate at a desired frequency, for instance, a frequency at or close to the resonant frequency of the desired nanotube. In one embodiment, the resonant oscillation may generated by a source 22, such as a microwave source, similar to that available from Techtrol Cyclonetics in New Cumberland, Pa. Of course, the resonant oscillation may also be generated by any other mechanisms known to create THz EM frequencies, such as an induced current from a coil surrounding the synthesis chamber 11, or from an oscillating magnetic field situated circumferentially about the synthesis chamber 11.

Although illustrated as being substantially entirely within the synthesis chamber 11, it should be appreciated that the resonant cavity 21 may be positioned either within the synthesis chamber 11 or partially within the synthesis chamber 11. To the extent that the resonant cavity 21 may be placed entirely within the synthesis chamber 11, the resonant cavity 21 may be exposed to substantially high temperature, i.e., temperature necessary to permit nanotube growth. However, when positioned partially within the synthesis chamber 11, the resonant cavity 21 may be placed about an entrance portion 23 of the furnace 116, so that the cavity 11 does not substantially "see" the highest temperature within the synthesis chamber 11.

In an embodiment, the resonant cavity 21 may be made from a high temperature metal, such as molybdenum or other similar metals, and the system 10 can be one that utilizes a gas phase pyrolysis system. In an alternate embodiment, system 10 may be designed to use a microwave plasma to induce nanotube growth.

Still looking at FIG. 2, system 10 may include individual inlets 24 and 25 through which a reactive gas (i.e., carbon source) and a suitable catalyst precursor (i.e., catalyst particle source) may be introduced into the heated synthesis chamber 11, respectively. The catalyst precursor 25 provides a source from which a catalyst particle can be generated for subsequent growth of the single-walled nanotube thereon. The reactive gas 24, on the other hand, provides a carbon source for depositing carbon atoms onto the catalyst particle in order to grow the nanotube. In certain instances, it may be desirable to also introduce a conditioner compound into the synthesis chamber 11. In an embodiment, the conditioner compounds can act to control size distribution of the catalyst particles generated from the catalyst precursor 25, and thus the diameter of the nanotubes growing on each of the catalyst particles. Although the system 10 provides individual inlets for the reactive gas 24 and the catalyst precursor 25, it should be appreciated that if a mixture of the reactive gas 24 and catalyst precursor 25, along with the conditioner compound, is provided, such a mixture can be introduced into the synthesis chamber 11 through a single inlet.

Examples of a reactive gas 24 for use in connection with the present invention include, but are not limited to, ethanol, methyl formate, propanol, acetic acid, hexane, methanol, or blends of methanol with ethanol, or any combination thereof. Other carbon sources may also be used, including $C_2H_2$, $CH_3$, and $CH_4$, or a combination thereof.

Examples of a catalyst precursor 25 from which catalyst particles may be generated includes ferrocene, nickelocene, cobaltocene, materials such as iron, iron alloy, copper, gold, nickel or cobalt, their oxides or their alloys, a combination of any of these, or a combination of any of these with other metals or ceramics compounds, such as aluminum oxide, MnO, or other similar oxides. Alternatively, the catalyst particles may be made from metal oxides, such as $Fe_3O_4$, $Fe_2O_4$, or FeO, or similar oxides of cobalt or nickel, or a combination thereof. Another alternative is carbonyl compounds of iron, cobalt or nickel.

Examples of a conditioner compound for use in connection with the fluid mixture of the present invention include Thiophene, $H_2S$, other sulfur containing compounds, or a combination thereof.

In one embodiment of the invention, system 10 can be designed so that the catalyst precursors 25 introduced into system 10 can subsequently provide a batch of catalyst particles within the synthesis chamber 11, whether it be a laminar flow of catalyst particles or fluidized bed of catalyst particles, and from which nanotubes may be grown.

In an alternate embodiment, rather than creating a batch of catalyst particles, a substrate preseeded with catalysts may be positioned either horizontally or vertically, relatively to the direction of gas flow, within the synthesis chamber 11 to provide a base from which nanotubes may be grown. To the extent that the substrate may be positioned vertically, the substrate may be porous to permit the gas flow to pass therethrough. When using a substrate preseeded with catalysts, system 10 may not need to introduce a catalyst precursor 25 into the synthesis chamber 11.

In either the fluidized bed or the preseeded substrate embodiments, the catalyst particles may be exposed, within system 10, to a substantially high frequency field, such as an electromagnetic field, an electric field or a magnetic field within cavity 21 in the synthesis chamber 11. The high frequency field, as noted above, can be generated by source 22. The selected resonant frequency to be imposed by source 22, in one embodiment, may be keyed into the radial breathing mode (RBM) of a particular or predetermined nanotube diameter. Since this RBM can be unique to the chiral nature of a nanotube, the chirality for the nanotubes to be fabricated can, therefore, be preselected prior to growth and maintained throughout the growth process. In an embodiment, a narrow band of electromagnetic radiation in the terahertz (THz) region, corresponding to the natural radial breathing mode of a certain chiral nanotube, may be selected for the particular chirality to be generated.

Thereafter, because the nanotube being fabricated and the catalyst particle from which nanotube growth occurs both resonate at the same frequency, as imposed by source 22, any nanotube being initiated but not be at the resonant frequency being imposed can be suppressed. As a result, only those nanotubes growing at the imposed resonant frequency, and thus the specified chirality, can continue to grow.

Figure 3:
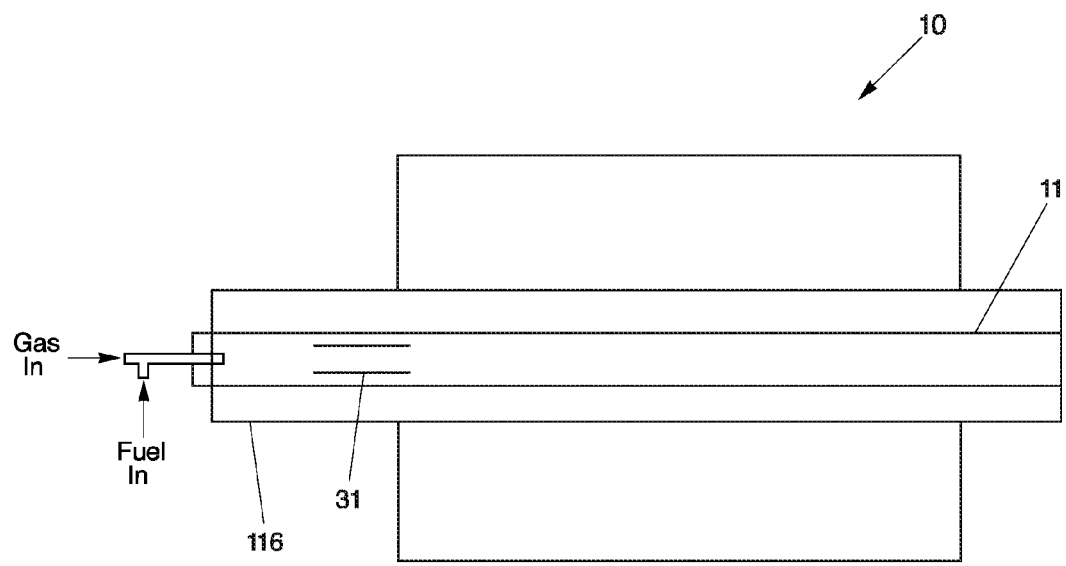
FIG. 3 illustrates a radiator plate for use in connection with the system shown in FIG. 1 for passively controlling the chirality of the carbon nanotubes being fabricated.

In another embodiment of the present invention, looking now at FIG. 3, system 10 may be modified to provide an alternative approach to passively control the chirality of the nanotubes being fabricated. In particular, since the furnace 116 in which the nanotubes may be fabricated also operate at a substantially high temperature level, once the single-walled nanotubes initiate growth within the high temperature environment of the synthesis chamber 11, these nanotubes may re-radiate at their own natural frequency. Such a frequency, in an embodiment, can approximate the diameter of the re-radiating nanotubes. As such, a these nanotubes re-radiate, they can stimulate adjacent nanotubes to resonate at a similar frequency, so as to cause the adjacent nanotubes to grow at or near a similar diameter, and thus similar chirality. To that end, system 10 may be provided with at least one radiator plate 31 that can be stimulated by the heat radiation of furnace 116 to re-radiate at the natural frequency of the radiator plate 31. In one embodiment, radiator plate 31 may be positioned vertically or horizontally to the direction of gas flow within synthesis chamber 11. Such a radiator plate 31 may be a seeded substrate provided with preselected individual nanotubes having the desired chirality, for example (10,10), at about 1.4 nm in diameter. Of course, other chiral characteristics and diameters may be used. If vertically positioned to the direction of gas flow, radiator plate 31 may be porous to permit reactive gas to flow therethrough.

Figure 4:
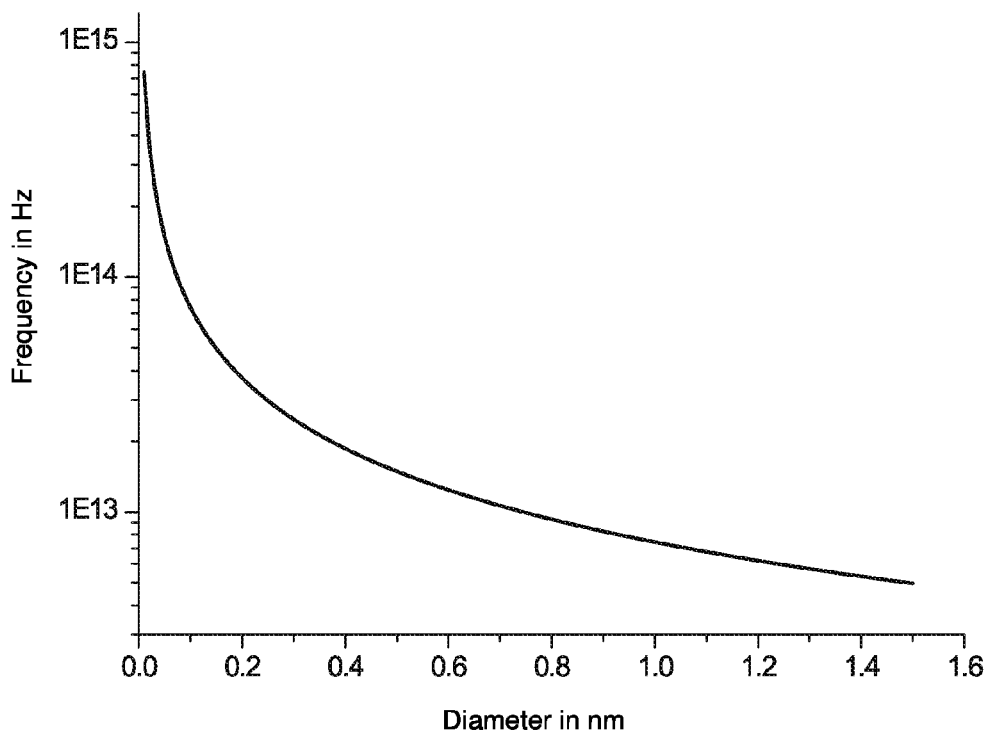
FIG. 4 illustrates a Frequency vs. Diameter curve for the carbon nanotubes generated using the system of FIGS. 2 and 3, in connection with one embodiment of the present invention.

With reference now to FIG. 4, it should be appreciated that typically, the catalyst particles used in connection with the present invention may be relatively larger than the carbon nanotubes fabricated by a factor that can be as high as about 1.6 times. It is possible, therefore, to have a range of catalyst diameters all producing tubes of a substantially similar diameter, and substantially uniform chirality. Such a possibility can result when the catalysts, in an embodiment, may be molten, as expected to be the case, at temperatures exceeding 1250° C. within the synthesis chamber 11.

System 10 of the present invention, as provided, can therefore be adapted to provide a protocol to passively control the chirality of the nanotubes fabricated. As a result of such a capability, system 10 can be utilized to produce substantially uniform carbon nanotubes of the same chirality.

Active Control of Chirality

System 10 can also be adapted to provide a protocol to actively control the chirality of the nanotube being fabricated. In this approach, system 10 may include a first furnace for generating energy (i.e., heat radiation) and a filter within the first furnace to select for energy within a particular frequency or a small band of frequencies, while blocking or shunting the others frequencies to prevent them from passing through. The selected energy, in an embodiment, may be within a particular THz frequency or within a small band of THz frequencies. The system may also include a second furnace for receiving the selected energy, and either (i) a batch of particles, for instance, a laminar flow of catalyst particles, or a fluidized bed of catalyst particles, or (ii) a seeded substrate, for instance, seeded with catalyst particles, or seeded with nanotubes of a desired chirality. The batch of particles or seeded substrate, in an embodiment, in the presence of the selected energy within the particular radiation band of interest may be directly stimulated and may provide a template (i.e., footprint) to initiate nanotube growth at or near the selected/desired diameter, and thus chirality.

Figure 5:
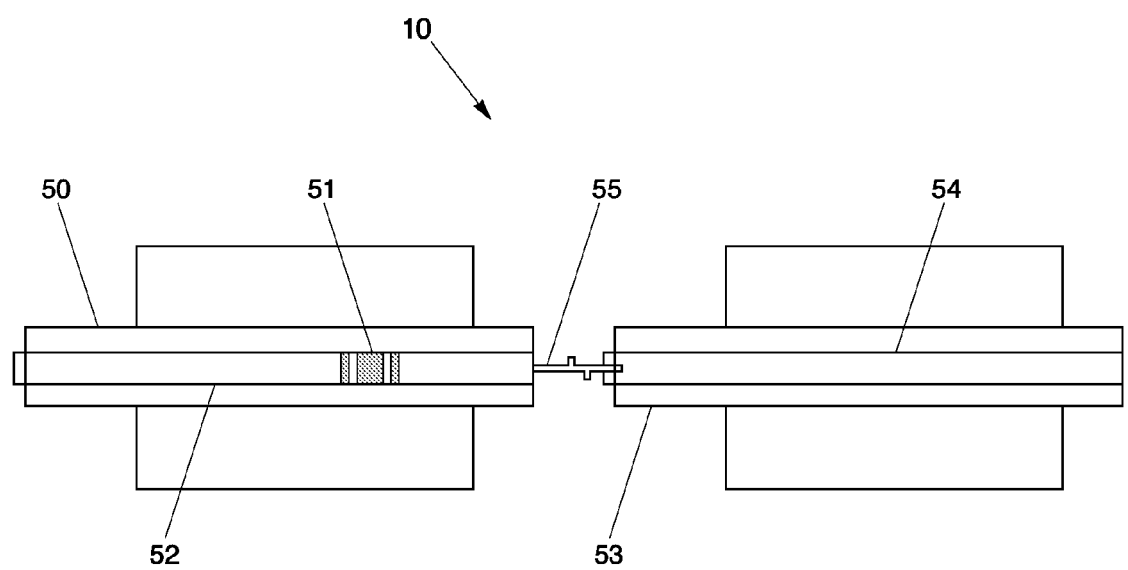
FIG. 5 illustrates a schematic view of a terahertz (THz) filter for use in connection with the system shown in FIG. 1 for actively selecting carbon nanotubes with a specific chirality during fabrication.
Figure 6:
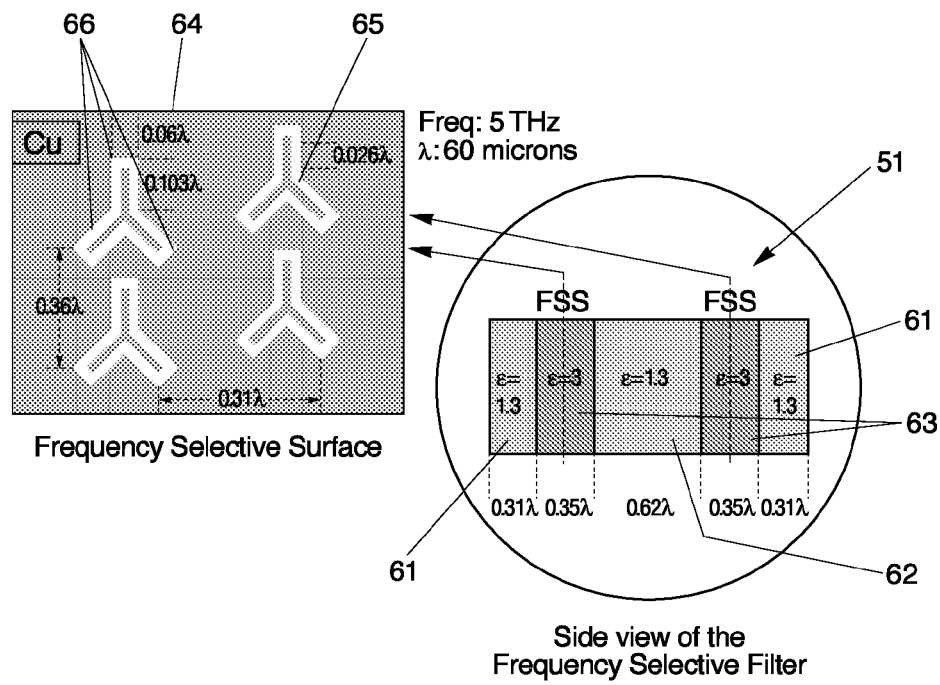
FIG. 6 illustrates a schematic view of a frequency selective filter, including its cross sectional view, for use in connection with the system shown in FIG. 1.

In one embodiment, as illustrated in FIGS. 5 and 6, system 10 may be provided with a first furnace 50 and a frequency selective filter 51 positioned within synthesis chamber 52. Frequency selective filter 51 may be designed to permit energy, for instance, within a particular THz frequency or a small band of frequencies to pass therethrough. Filter 51, as shown in FIG. 6, includes outer members 61, an inner member 62, and a filtering member 63 situated between inner member 62 and each of outer members 61.

The outer members 61 and the inner member 62, in an embodiment, may be made from a dielectric material, and may be designed to selectively permit energy at a substantially constant frequency bandwidth and at a particular angle of incidence to pass therethrough. The filtering members 63, similarly, may be made from a dielectric material, and may include a frequency selective surface 64 embedded therein. The frequency selective surface 64, in an embodiment, may include one or more slots 65, each being similarly dimensioned to permit energy at a desired frequency or small band of frequencies to pass therethrough. As illustrated, slots 65 may be positioned in a desired geometric pattern. In addition, each of slots 65 may include three lobes 66 (i.e., tri-lobe). According to one embodiment, lobes 66 may be substantially equidistant from one another.

System 10 may also include a second furnace 53 in fluid communication with the first furnace 50. In an embodiment, the second furnace 53 may be similar to the furnace shown in FIG. 2 and may include a laminar flow of catalyst particles, a fluidized bed of catalyst particles, or a substrate seeded with catalyst particles (not shown) within synthesis chamber 54. Alternatively, the second furnace 53 may be similar to the furnace shown in FIG. 3 and may include a substrate seeded with nanotubes (not shown) having a desired chirality within synthesis chamber 54. The second furnace 53, in fluid communication with the first furnace 50, may be designed to direct the selected energy from first furnace 50 into synthesis chamber 54 to directly stimulate the catalyst particles or the nanotubes on the substrate within synthesis chamber 54 to initiate nanotube growth at or near the selected or desired diameter, and thus chirality.

To initiate nanotube growth, taking advantage of the ability of the furnace of the present invention to generate heat radiation (i.e., energy) in the terahertz (THz) range, especially when temperature within the furnace reaches above about 1250° C., furnace 50 may be permitted to generate the necessary heat radiation within the synthesis chamber 52 in the THz range. The heat radiation, may then be directed downstream in synthesis chamber 52 toward filter 51, where heat radiation of a particular frequency or a small band of frequencies can be allowed to pass through the frequency selective surface 64. The selected radiation, thereafter, may be directed into the second furnace 53 through a pathway 55.

In the embodiment where the second furnace 53 may be similar to the furnace in FIG. 2, since the selected radiation resonates at a frequency or small band of frequencies within a particular THz range, the selected radiation can similarly impose such resonant frequency or frequencies on the catalyst particles from which nanotube growth occurs and any nanotube which has initiated growth. In the presence of the imposed resonant frequency, any nanotube being initiated but not be at the resonant frequency being imposed can be suppressed. As a result, only those nanotubes growing at the imposed resonant frequency, and thus the specified chirality, can continue to grow.

In the embodiment where the second furnace 53 may be similar to the furnace in FIG. 3, since the selected radiation resonates at a frequency or small band of frequencies within a particular THz range, the selected radiation can similarly impose such resonant frequency or frequencies on the substrate having nanotubes with the desired chirality. In the presence of the imposed resonant frequency, once a single-walled nanotube initiate growth, the nanotube may re-radiate at their own natural frequency to stimulate adjacent nanotubes to also grow at or near a similar diameter, and thus similar chirality.

Although reference is made to energy/radiation within the terahertz range, it should be appreciated that furnace 50 of system 10 may be modified to select for energy/radiation within other frequency ranges.

THz Generator

Figure 7:
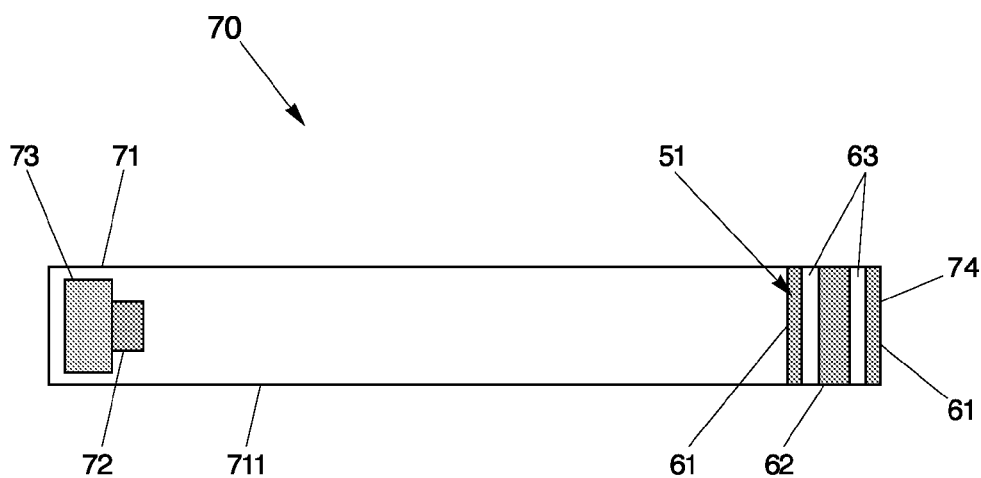
FIG. 7 illustrates a schematic view of a terahertz (THz) generator, in connection with an embodiment of the present invention.

Taking advantage of the ability of the furnace 50 of the present invention to generate heat radiation (i.e., energy) in the terahertz (THz) range, especially when temperature within the furnace reaches above about 1250° C., and the fact that the design of filter 51 makes it substantially ideal as a notch filter for selectively allowing only energy of within the THz range to pass, furnace 50 may be modified along with filter 51 to provide a THz generator 70, as illustrated in FIG. 7, capable of yielding significant power. Such a THz generator 70 can be utilized in a number of different applications.

THz generator 70, in an embodiment, includes a housing 71 having sides 711, a heat source 72, such as a flash lamp, positioned at one end of housing 71, and frequency selective filter 51 positioned at an opposite of housing 71. Heat source 72, in an embodiment, may be used to generate short pulses of the necessary heat radiation (e.g., above 1250° C.) within the terahertz range. As such, heat source 72 may be coupled to a capacitor 73 capable of providing the sufficient power to permit the heat source to generate such a level of heat radiation. Generator 70 may also include an exit port 74 adjacent filter 51 to permit heat radiation at the selected frequency by filter 51 to exit housing 71.

Filter 51, as indicated above, includes the filtering members 63, which may be designed, so that each of slots 65 on frequency selection surface 64 may be capable of selecting a center frequency (i.e., targeted frequency). In an embodiment, the center frequency may be 5 THz, or any other desired frequency. The outer members 61 and the inner member 62 of filter 51, on the other hand, may be designed to selectively permit energy at a substantially constant frequency bandwidth of about +0.3, relative to a center frequency, at an angle of about 45° of incidence to an angle normal incidence. In an example, if the center frequency (i.e. targeted frequency) that is permitted to get through is, for instance, 5 THz, then the energy striking the outer members 61 and inner member 62, at angles of 45° or greater, may pass through at frequencies of from about 3.5 THz to about 6.5 THz. This bandwidth can decrease toward a single frequency of 5 THz as the angle of incidence approaches normal striking. It should be appreciated that given the design of the filtering member 63 and their dielectrics, the bandwidth can further decrease to from about 4.55 THz to about 5.45 THz. In particular, each of slots 65 on frequency selection surface 64 may be responsible for the peak of the transmission/receive curve for a particular center frequency selected. In addition, filtering members 63 can produce curves for angles of incidence from about 0 to 60° for each of the frequency selective surfaces 64 that are substantially identical. To this end, the bandwidth approaches an ideal notch filter. In particular, the curves rise quickly to the frequency desired, then fall off substantially sharply after that frequency.

EXAMPLE

To illustrate that generator 70 may be designed to provide sufficient heat radiation within the THz range, assuming the temperature generated by heat source 72 inside of housing 71 of generator 70 may be about 1250° C., then using Weins Displacement law, the wavelength at which maximum energy can be emitted, as defined by:

$$T\lambda_{max} = 2.898 \times 10^6 \text{ nmK}$$

can, therefore, be $$\lambda_{max} = 2.898 \times 10^6 / (1250° \text{ C.} + 273.15° \text{ C.})$$

$$\lambda_{max} = 1902.635 \text{ nm}$$

or, $$\text{Frequency}_{max} = 157.67 \text{ THz}$$

Now using Plank's Law to find the power at, for example, 5 THz, that can be emitted from generator 70, using $$I(\lambda, T) = (2hc^2/\lambda^5) \cdot (1/e^{hc/\lambda kT} - 1)$$

h=6.626 068 96(33)×10⁻³⁴ J·s=4.135 667 33(10)×10⁻¹⁵ eV·s, and
k=1.380 6504(24)×10⁻²³ J/K
it is calculated that $$I(\lambda, T) = \sim 903{,}000$$

in units of energy per unit time per unit surface area per unit solid angle per unit wavelength.

It should be noted that the heat radiation generated by heat source 72 within housing will be reflected by the surfaces of sides 711 and along the length of housing 71 before it exits through the end of housing 71 with exit port 74. In an example where each of these sides 711 is about 0.7 m, then the surface area of housing 71 that can act to reflect the heat radiation is about 0.5 m². If I(λ,T) is multiplied by the surface area of housing 71, while assuming the solid angle to be a sphere, which is about 4π radians, and that the wavelength may be about 60 μm, then the wattage should be:

$$\text{Watts}(5 \text{ Terahertz}) = 340 \text{ W}$$

This is a great deal of wattage for the given frequency generated by generator 70. However, in the presence of the frequency selective filter 51, the amount of energy and thus power that can pass through and exit housing 71 will decrease. With the configuration and parameters noted above, filter 51 should permit energy at frequencies from about 4.55 THz to about 5.45 THz, to pass therethrough, while highly attenuating all other frequencies.

To find out how much power will exit though exit port 74 of housing 71, if it is assumed that sides 711 completely reflect the energy along the interior of housing 71, the transmission coefficients can then be calculated for the material that comprises each side 711 of housing 71, and a determination can be made as to what makes it through exit port 74.

Assuming parallel polarization of energy, and about 0° angle of incidence, if this power is divided by the area of the end through energy exits through port 74, power density can be obtained for generator 70. In practice, there will be both parallel and perpendicular polarizations and many angles of incidence. As such, these angles of incidence can act to decrease the total power transmission. Although what can be calculated is the maximum transmitted power, it nevertheless can provide an idea of at least the order of magnitude of power. Using the equations below, $$T_\pi = 2\epsilon_2 k_x / (\epsilon_2 k_x + \epsilon_1 k_{tz})$$

where $$k_{tz} = (k_2^2 k_x^2)^{0.5}$$

the following can be calculated:

| Permittivity | Transmission coefficients |
|---|---|
| Air to 1.3 | 0.95792135 |
| 1.3 to 3 | 0.579501721 |
| 3 to 1.3 | 0.730682314 |

Next, based on the above results, the total power emanating from exit port 74 can be calculated to be:

58 Watts, or

116 W/m²

This would be the maximum power output due to the considerations already stated. However, the materials that make up the permittivity surfaces in filter 51 can act to further decrease power output. In particular, as the critical angle through filter 51 may be about 41.2°, it can act to further decrease power output. Critical angles occur when going from a more dense the dielectric material in filter 51, for example, with relative permittivity of 3, to a less dense the dielectric material in filter 51, for example, with relative permittivity of 1.3. As a result, the maximum power that could be transmitted from generator 70 through exit port 74 can be:

$$(41.2/90) \cdot 58.4623 \text{ Watts} = 26.7425 \text{ Watts}$$

It is understood that in order to keep the notch filter cool, that a separation between the filter 51 and the heat generator 72 may be required, and this separation can further reduce the energy output.

Applications

To the extent that a THz generator capable of yielding significant power can be provided, such a THz generator can be utilized in a number of different applications. In addition, since housing 71 can be modified to be of a small or portable size, the THz generation technology may also be used commercially in a manner that may otherwise not be possible at present. In particular, the THz generation technology of the present invention may be used in connection with (1) radar sensing, including better weather penetration, along with higher angular resolution normally associated with EO systems, (2) remote detection of chemical and biological agents that might resonate with a desired wavelength, (3) detection of cracks in space shuttle foam, (4) tumor imaging, such as that in breast tissue, (5) counterfeit detection, such as detecting counterfeit watermarks on paper currency, and (6) providing valuable spectroscopic information about the composition of a material, especially in chemical and biological species, all of which may resonate at a frequency similar to the energy leaving the THz generator.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

What is claimed is:

1. A method for manufacturing nanotubes, the method comprising:
   exposing a plurality of catalyst particles from which nanotubes can grow to a substantially high frequency field;
   resonating the catalyst particles at a selected resonant frequency keyed to a radial breathing mode unique to a desired chiral nature of a nanotube to be manufactured; and
   allowing those nanotubes having a resonant frequency substantially similar to the selected resonant frequency, and thus the unique desired chiral nature, to be grown.

2. A method as set forth in claim 1, wherein, in the step of exposing, the substantially high frequency field includes one of an electromagnetic field, an electric field, or a magnetic field.

3. A method as set forth in claim 1, wherein the step of exposing includes exposing the catalyst particles to a substantially high temperature necessary to permit nanotube growth.

4. A method as set forth in claim 1, wherein the step of exposing includes introducing the catalyst particles to a reactive gas for use as a source for nanotube growth on the catalyst particles.

5. A method as set forth in claim 1, wherein the step of resonating includes generating a substantially high frequency field.

6. A method as set forth in claim 5, wherein the step of generating includes providing one of an electromagnetic field, an electric field, or a magnetic field.

7. A method as set forth in claim 1, wherein, in the step of resonating, the radial breathing mode (RBM) is keyed to a diameter of the nanotube to be manufactured.

8. A method as set forth in claim 7, wherein, in the step of resonating, the diameter to which the RBM is keyed can be unique to a chiral nature of that nanotube.

9. A method as set forth in claim 1, wherein in the step of resonating, the plurality of catalyst particles can be provided as one of a laminar flow of catalyst particles, a fluidized bed of catalyst particles or a substrate seeded with catalyst particles.

10. A method as set forth in claim 1, wherein the step of allowing includes permitting a volume of nanotubes substantially uniform in their chiral nature to be manufactured.

11. A method of manufacturing nanotubes, the method comprising:
    generating within a first environment radiant energy;
    filtering, within the first environment, the radiant energy so as to select for energy within a particular resonant frequency or small band of frequencies corresponding to a chiral nature of a desired nanotube;
    directing, from the first environment into a second environment, the selected energy within a particular resonant frequency or small band of frequencies;
    exposing a template positioned in the second environment to the selected energy, so that the template can be stimulated in the presence of the selected energy and provide a footprint from which nanotubes can grow; and
    permitting nanotubes exhibiting a resonant frequency substantially similar to the selected resonant frequency or small band of frequencies, and thus the desired chiral nature, to grow from the template.

12. A method as set forth in claim 11, wherein, in the step of generating, the radiant energy within the first environment exceeds about 1250° C.

13. A method as set forth in claim 11, wherein, in the step of generating, the radiant energy includes energy within a particular terahertz frequency or a small band of terahertz frequencies.

14. A method as set forth in claim 11, wherein the step of filtering includes blocking energy outside the selected particular resonant frequency or small band of frequencies.

15. A method as set forth in claim 11, wherein the step of directing includes introducing a reactive gas into the second environment for initiating nanotube growth.

16. A method as set forth in claim 11, wherein, in the step of exposing, the template includes one of a batch of particles or a seeded substrate.

17. A method as set forth in claim 16, wherein, in the step of exposing, the batch of particles includes a laminar flow of catalyst particles, or a fluidized bed of catalyst particles, and wherein the seeded substrate includes a substrate seeded with catalyst particles.

18. A method as set forth in claim 16, wherein, in the step of exposing, the seeded substrate includes a substrate seeded with nanotubes of a desired chirality.

19. A method as set forth in claim 18, wherein the step of exposing includes directing introducing a catalyst precursor and a reactive gas into the second environment for nanotube growth on the substrate.

20. A method as set forth in claim 11, wherein the step permitting includes allowing a volume of nanotubes substantially uniform in their chiral nature to be manufactured.

* * * * *